United States Patent [19]

Nozawa et al.

[11] Patent Number: 4,620,917
[45] Date of Patent: Nov. 4, 1986

[54] ELECTROSTATIC FILTERING DEVICE

[75] Inventors: Masaei Nozawa, Aichi; Sigeru Kamiya, Chiryu; Shigeo Iwashita, Kariya, all of Japan

[73] Assignee: Nippon Soken, Inc., Nishio, Japan

[21] Appl. No.: 721,495

[22] Filed: Apr. 10, 1985

Related U.S. Application Data

[63] Continuation of Ser. No. 461,526, Jan. 27, 1983, abandoned.

[30] Foreign Application Priority Data

Feb. 8, 1982 [JP] Japan .................................. 57-17601

[51] Int. Cl.$^4$ .......................... B01D 35/06; B03C 5/02
[52] U.S. Cl. .................................. 204/302; 204/188; 210/748
[58] Field of Search .......................... 204/302, 304–308, 204/188, 186, 149; 55/131; 210/748

[56] References Cited

U.S. PATENT DOCUMENTS

| 3,324,026 | 6/1967 | Waterman et al. | 204/302 |
| 3,445,376 | 5/1969 | Stenzel | 204/302 |
| 3,567,619 | 3/1971 | Brown | 204/302 |
| 3,891,528 | 6/1975 | Griswold | 204/186 |

Primary Examiner—John F. Niebling
Assistant Examiner—William T. Leader
Attorney, Agent, or Firm—Cushman, Darby & Cushman

[57] ABSTRACT

Carbon particles are effectively removed from contaminated lubricating oil, for example, in a diesel engine by an electrostatic filtering device comprising a porous dielectric inserted between positive and negative electrodes in a container into which the contaiminated lubricating oil in introduced. In particluar, in the preferred embodiment the spaced parallel electrodes sandwich a porous dielectric film for collecting particles and a porous spacer which is disposed between the porous dielectric film and one of the electrodes. The pores of the porous spacer have a size which is considerably larger than that of the pores of the particle-collecting film.

22 Claims, 12 Drawing Figures

ELECTROSTATIC FILTERING DEVICE

This is a continuation of application Ser. No. 461,526, filed Jan. 27, 1982 which was abandoned upon the filing hereof.

BACKGROUND OF THE INVENTION

1. Field of the Invention

The present invention relates to an electrostatic filtering device, more particularly to an electrostatic filtering device for collecting and removing carbon particles from lubricating oil for a diesel engine.

2. Description of the Prior Art

Diesel engines have recently come into increased use for automobiles due to their lower fuel consumption compared to gasoline engines. Diesel engines, however, discharge more so-called "smoke" than gasoline engines. Much of the smoke consists of unburnt carbon particles. These particles are mostly discharged into the air with the exhaust gases, but also enter into the lubricating oil. As a result, the lubricating oil used for diesel engines becomes contaminated sooner than that used for a gasoline engine. Carbon particles dispersed in lubricating oil have a very small grain size of about 0.3 to 0.4 $\mu$m (micrometer), but their great amounts accelerate the friction at sliding portions of the engine, thus shortening the lifetime of the oil.

In actual operation of automobiles with gasoline engines, the lubricating oil should be replaced approximately every 8000 km. In automobiles with diesel engines, however, the lubricating oil should be replaced approximately every 4000 km. Furthermore, it has been found that, at the time of replacement while the carbon particle concentration in the lubricating oil used in a gasoline engine is about 0.05% to 0.08% based on the weight of the oil, the carbon particle concentration in the lubricating oil used in a diesel engine is about 2% to 3%. This is in spite of the earlier replacement of the lubricating oil used in a diesel engine and reflects the severe pollution of the same.

Various approaches have been taken for removing the carbon particles from the lubricating oil. One of these approaches calls for the use of a "roll tissue paper filter" primarily composed of cotton linter pulp paper wound up in the form of a roll. The particulate pollutants adhere to the cellulose fiber surface of the roll and are subsequently removed therefrom. The efficiency of removal of carbon particles from oil by this type of filter, however, is 20% to 30%, as described later. Another approach calls for the use of electrostatic force and electrodes to attract and catch pollutants in oil. This type of oil cleaning device is highly efficient for the removal of particles such as metal, but is not so efficient for carbon particles. Still another approach calls for the use of a filter medium having small pores of about 0.2 to 0.3 $\mu$m(micrometer). While this approach enables fair removal of carbon particles, the carbon particles accumulate onto the filter surface, clogging the filter and preventing the oil from effectively passing therethrough.

SUMMARY OF THE INVENTION

It is, therefore, an object of the present invention to provide a filter device capable of collecting and removing carbon particles from lubricating oil at an extremely high efficiency so as to effectively clean the oil.

This and other objects, features, and advantages of the present invention are accomplished by an electrostatic filtering device comprising a container for receiving liquid to be cleaned; a positive electrode placed in the container; a negative electrode arranged in the container in parallel to the positive electrode; and a porous dielectric arranged between the positive and negative electrodes for collecting particles in the liquid to be cleaned. In particular, in the preferred embodiment the spaced parallel electrodes sandwich a porous dielectric film for collecting particles and a porous spacer which is disposed between the porous dielectric film and one of the electrodes. The pores of the porous spacer have a size which is considerably larger than that of the pores of the particle-collecting film.

BRIEF DESCRIPTION OF THE DRAWINGS

These and other objects, features, and advantages of the invention will be more fully described with reference to preferred embodiments and the accompanying drawings, wherein.

DESCRIPTION OF THE PREFERRED EMBODIMENTS

Figure 1:
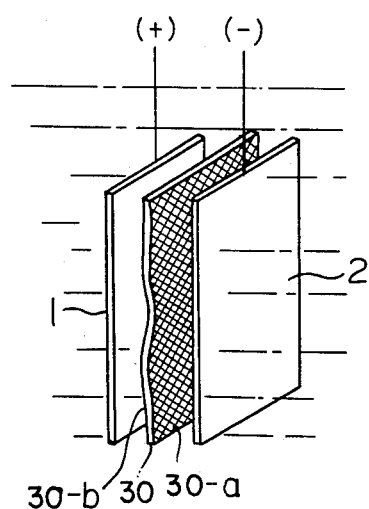
FIG. 1 is a schematic view of the essential parts of an electrostatic filtering device according to the present invention.

FIG. 1 is a schematic view of the essential parts of an electrostatic filtering device according to the present invention, in which a film 30 for collecting particles is inserted between a positive electrode 1 and a negative electrode 2 in a container (not shown) into which liquid to be cleaned is introduced. When oil contaminated by carbon particles is fed between the two electrodes 1 and 2 and a high direct current voltage is applied therebetween, the particle collecting film 30 catches a great amount of carbon particles, thereby cleaning the oil.

The applicants consider the mechanism by which carbon particles are collected by the electrostatic filtering device described above to be as follows: Generally speaking, carbon particles dispersed in oil and existing between positive and negative electrodes are attracted toward the positive electrode 1 by coulomb force, since almost all carbon particles are negative in charge. When the positive electrode 1 is of an electrically conductive material such as metal, the carbon particles rapidly lose their negative charge on contact therewith and receive a positive charge. As the carbon particles are then positively charged, they are repelled from the positive electrode plate 1 redisperse into the oil without being caught. Here, however, a dielectric such as synthetic resin is placed between the electrodes 1 and 2. The dielectric undergoes polarization, becoming positive on the negative electrode side 30-a and negative on the positive electrode side 30-b. The negatively charged carbon particles in the oil are attracted to the positively charged side 30-a of the dielectric. When the carbon particles contact the dielectric, they gradually lose their charge and become electrically neutral since the positive charge of the dielectric is not great enough to make them positive. Thus, these particles are caught at the surface of the dielectric. Carbon particles which are charged positive in the oil are similarly caught at the negatively charged side 30-b of the dielectric.

It should be noted that while the above explanation is made in reference to carbon particles, it also applies to metal particles and other particles which may be electrostatically charged. Further, particles can be removed from any liquid e.g., water in which particles are suspended.

In general, the positive and negative electrodes 1 and 2 of the electrostatic filtering device of this invention are made of metal. The particle collecting film 30 inserted between the electrodes 1 and 2 is made of a dielectric material. The dielectric material may be fluorine-containing resin, for example, polytetrafluroethylene and polychlorotrifluoroethylene, polyethylene, and other synthetic resins; nitrocellulose and other cellulose; and glass fiber. Fluorine-containing resin and polyethylene and preferable and fluorine-containing resin is particularly preferable. The applicants consider the reason why excellent results can be obtained by fluorine-containing resin or polyethylene to be as follows. Fluorine-containing resin and polyethylene are electrically symmetric due to the absence of hydroxyl groups, methyl groups, and other electrically active sites in their atomic arrangement and, therefore, polarize uniformly. Cellulose and other dielectrics having electrically active sites are blocked from uniform polarization by their electrically active sites. This results in local negative-charged portions in the positively charged side 3-a of the dielectric, which obstructs the collection of particles. However, it should be noted that even a particle collecting film made of cellulose or another dielectric having electrically active sites can very effectively collect particles between electrodes in liquid.

The particle collecting film should be porous. This is believed necessary because flows of oil caused by the movement of particles should not be inhibited by the film. Too large pores, however, result in insufficient particles-collecting action. The applicant conducted experiments using fluorine-containing-resin film as the particle collecting film and obtained the preferred results when the widths of pores were from about 1 to 2 $\mu$m, in particular, 1.5 $\mu$m. For reference, it should be noted that the size of carbon particles in lubricating oil for a diesel engine is said to be generally in the range of about 0.3 to 0.4 $\mu$m.

Figure 2:
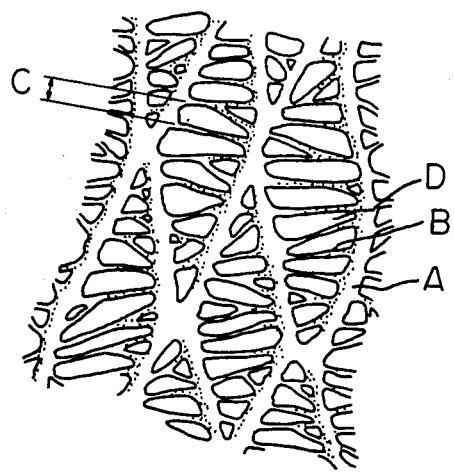
FIG. 2 is a schematic microscopic view of a fluorine-containing-resin film.

FIG. 2 shows a schematic microscopic view of the fluorine-containing-resin film used in the above experiment. It has a network structure composed of large skeletons A and small skeletons B bridged therebetween. The above-mentioned width of the pores is indicated by reference character C in FIG. 2. The form of the pores in the porous dielectric plate according to the present invention is not limited to those shown in FIG. 2.

Particle collecting film should be thick enough to insulate the high voltage between electrodes. The thickness required depends on the applied voltage, the type of dielectric material, and other factors. When the applied voltage is from about 2 kV to about 3 kV, which is considered suitable in the case of an automobile, however, a thickness of about 0.3 mm or more, in particular, from about 0.5 mm to about 0.6 mm, is preferable. Since too large a thickness of the particle collecting film would unnecessarily increase, the size of the electrostatic filtering device, an appropriate thickness should be selected. It should be noted here that porous on the market are synthetic-resin films and the like fairly thin, e.g., only 25 $\mu$m. Such films may therefore have affixed cotton cloth or another support so as not only to insulate between electrodes but also to mechanically reinforce the dielectric film.

In general, the higher the voltage applied between the two electrodes 1 and 2, the more effective the electrostatic field formed. Too high a voltage, however, is not desirable in the case of automobiles. A range of from about 2 kV to about 3 kV is sufficient to clean the lubricating oil in a diesel engine car and is, therefore, preferable.

Figure 3:
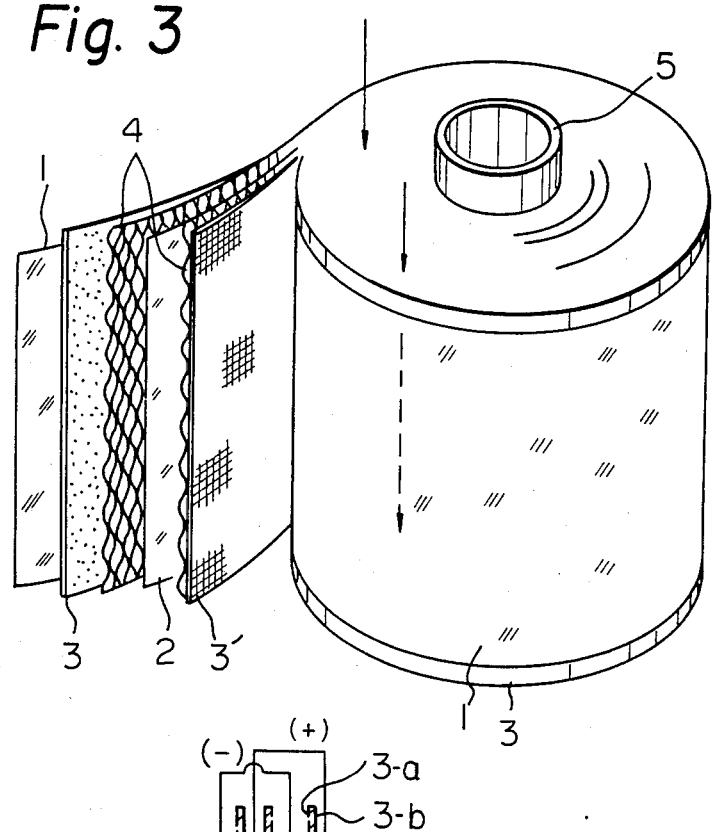
FIG. 3 is a schematical view of the essential parts of one embodiment of the electorstatic filtering device according to the present invention.

In a preferred embodiment of the present invention, the essential parts of which are as shown in FIG. 3, oil-permeable, electrically-insulating spacers 4 are inserted between the negative electrode plate 2 and particle collector 3. The particle collector comprises a dielectric film 30 supported by cottom cloth or other support. Although not shown in the figure, spacers 4 may also be inserted between the positive electrode 1 and the particle collector 3. Without spacers 4, when large amounts of carbon particles collect in the form of mud at the dielectric surfaces of the particle collector 3, the flow of the lubricating oil cause some of the carbon particles to flow out along with lubricating oil. The insertion of such spacers 4 is intended to prevent this. The spacers 4 may be comprised of synthetic fiber nonwoven cloth, cotton cloth, cellulose-based filter paper, glass fiber-based filter paper, and other electrically insulating fibrous filter materials. By use of such spacers 4, even if large amounts of carbon particles are collected at the dielectric surfaces, they will be held by the spacers 4 and will this be prevented from flowing out.

It is preferable that the spacers 4 serve as additional supports of the particle collector 3. As mentioned before, the porous synthetic-resin film used as the dielectric is mechanically very weak due to its thinness and is therefore generally backed with, e.g., cotton cloth as a primary support in addition, porous spacers 4 having a thickness of about 0.3 to 0.5 mm are usually placed between the supported film and the electrode to form a space to prevent direct contact of the film with the electrodes and to increase the amount of retainable carbon particles. Therefore it is possible to have the cotton cloth, etc. adhered with the film serve as both the support of the film and as the spacer. While film may be held directly between spacers without being adhered to a support, film is preferably adhered to a support which also serves as a spacer in order to prevent trouble at the time of assembly.

Referring now in more detail to FIG. 3, filtering components 1 to 4 of the device are wound around a metal cylindrical bobbin 5. The outer end of the electrode 1, for example, of 0.05 to 0.1 mm thick, aluminum foil, is pressure adhered to the inner surface of a metal container (not shown), housing the filtering device. The other end of the electrode 1 is free of any electrical connection. The electrode 2, similar to the electrode 1, is connected to the metal bobbin 5 at the inner end thereof and is free of any electrical connection at the outer end thereof. The electrodes 1 and 2 are supplied with positive and negative voltages to serve as positive and negative electrodes, respectively.

The particle collectors 3 and 3' are sandwiched between the electrodes 1 and 2. The particle collectors 3 and 3' are made, for example, by adhering a porous fluorine-containing-resin film of about 10 μm thickness to cotton cloth or the like of about 0.5 mm thickness, the resin film being arranged on the side of negative electrode 2.

Synthetic-resin net-like spacers 4 of about 0.5 mm thickness are inserted between the particle collectors 3 and 3' and the negative electrode 2 to prevent direct contact of the fluorine-containing-resin side of the particle collectors 3 and 3' with the negative electrode 2.

Lubricating oil flows between the filtering components 1 to 4 of the device approximately in the direction of the axis of the bobbin 5, the direction of the flow of the lubricating oil being indicated by the arrows in FIG. 3. When electrical potential is applied between electrodes 1 and 2, carbon particles are collected on the surface of the fluorine-containing-resin film and are removed.

Figure 4:
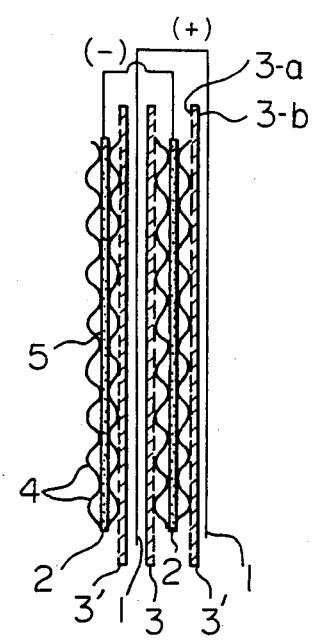
FIG. 4 is a schematic cross-sectional view of a part of the device of FIG. 3.

FIG. 4 shows the cross-sectional arrangement of the filtering components 1 to 4 of the device. Reference numeral 3-a represents the fluorine-containing-resin film of the particle collector 3 and reference character 3-b represents cotton cloth or the like. In FIG. 4, lubricating oil flows between the negative electrode 2 and the fluorine-containing-resin film 3-a and through the cloth 3-b, during which carbon particles are collected on the surface of the fluorine-containing-resin film 3-a.

Figure 5:
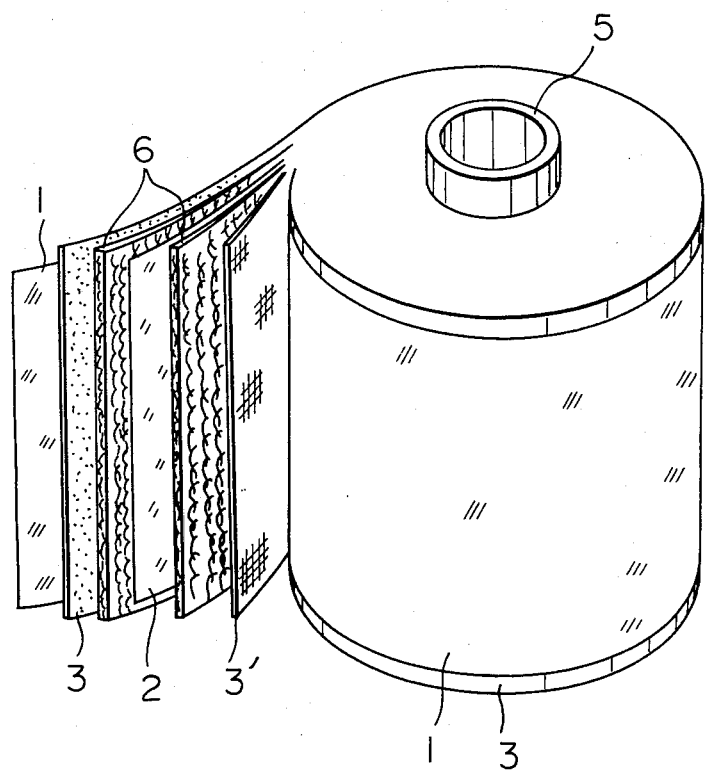
FIG. 5 is a schematic view of the essential parts of another embodiment of the electrostatic filtering device according to the present invention.

FIG. 5 shows the essential parts of another electrostatic filtering device according to the present invention. In FIG. 5, the same reference numerals as in FIG. 3 indicate the same components or parts. In this device, relatively coarse filter papers made of cellulose fiber or the like and having a thickness of about 0.5 mm are inserted as spacers 6 between the particle collectors 3 and 3' and the negative electrode 2. These spacers 6 serve to form spaces between the fluorine-containing-resin films and the negative electrode 2 and to prevent the outflow of carbon particles collected on the surface of the particle collectors 3 and 3'.

Figure 6:
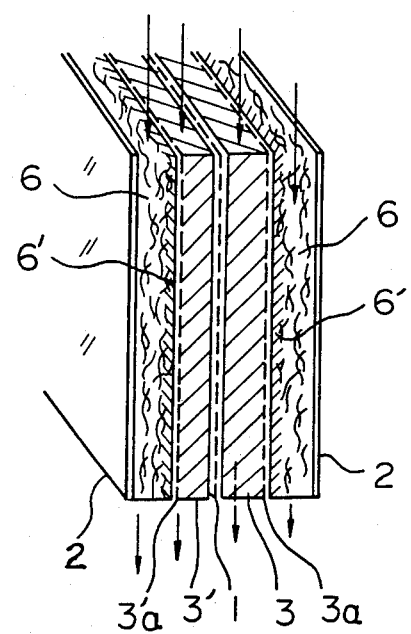
FIG. 6 is a schematic cross-sectional view of a part of the device of FIG. 5.

FIG. 6 shows the cross-sectional arrangement of the components or parts 1 to 4 and 6 of the device, the same reference numerals as in FIG. 5 indicating the same components or parts in FIG. 5.

Figure 7:
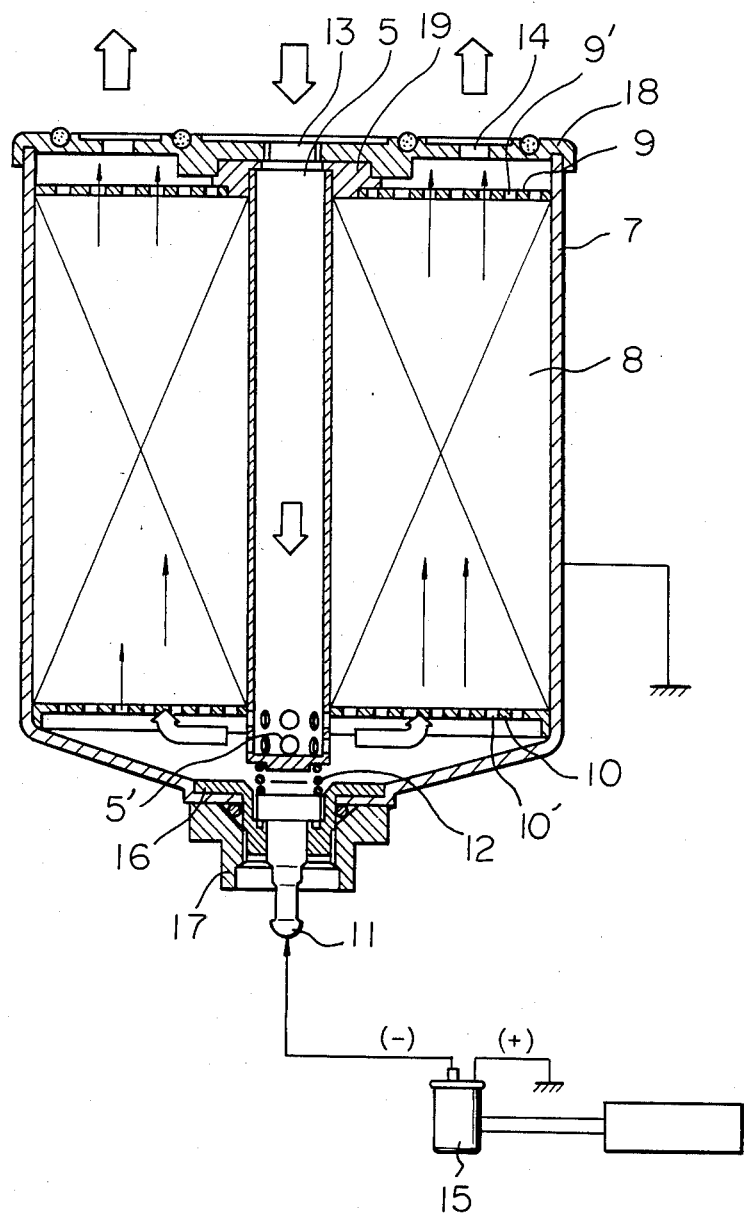
FIG. 7 is a vertical sectional view of the electrostatic filtering device of FIG. 3 or 5.

FIG. 7 shows the electrostatic filtering device of FIG. 3 or 5, in which an assembly 8 of the filtering components mentioned above is set in a container 7. The filtering components assembly 8 is maintained in position in the container 7 by plates 9 and 10 comprised of electrically insulating material and having many small perforations 9' and 10', respectively. The metal bobbin 5 is electrically connected from an outer DC high voltage power supply 15 through a terminal 11 and a spring 12. The container 7 is grounded onto a metal part of the automobile or the like. This enables the supply of a voltage difference between the two electrodes 1 and 2. The terminal 11 is electrically insulated from the container 7 by means of insulators 16 and 17. The side of the bobbin 5 opposite to the terminal 11 is also insulated by means of an insulator 19 and is covered with an endcap 18.

Lubricating oil is introduced through an opening 13 of the endcap 18 into the bobbin 5. It flows out of the bobbin 5 through small holes 5', passes through perforations 10' of the plate 10 to enter into the filtering component assembly 8, and exits through openings 14 of the endcap 18, as shown by the arrows in FIG. 7. The volume of the filtering component assembly 8 depends on the amount of lubricating oil to be cleaned. Experiments have shown, however, that a sufficient carbon particle removal rate and retention volume can be attained by about 100 cm$^3$ of filtering components assembly 8 per liter of lubricating oil.

Figure 8:
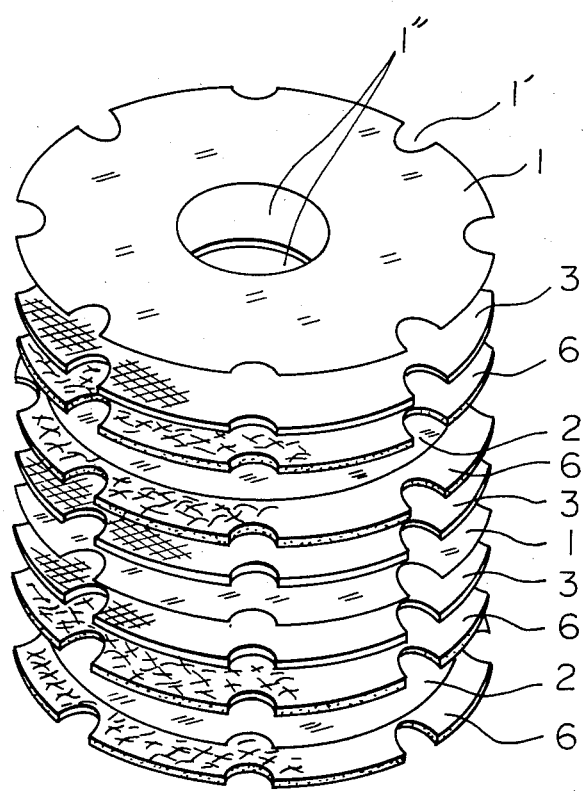
FIG. 8, is a schematic view of the essential parts of further embodiments of an electrostatic filtering device according to the present invention.

Although the above embodiments of the present invention call for formation of the filtering component assembly by laminating electrodes and a particle collector and winding the laminate around a bobbin, the filtering components assembly may be formed by alternatively laminating disklike electrodes and particle collectors. Referring to FIG. 8, positive electrodes 1, negative electrodes 2, particle collectors 3, and spacers 6 similar to those in the embodiment of FIG. 5 are all in the form of disks having cutaway sections 1' at the periphery thereof and openings 1" at the centers thereof. The relative arrangement of these filtering components 1, 2, 3, and 6 is the same as that of the embodiment of FIG. 5.

Figure 9:
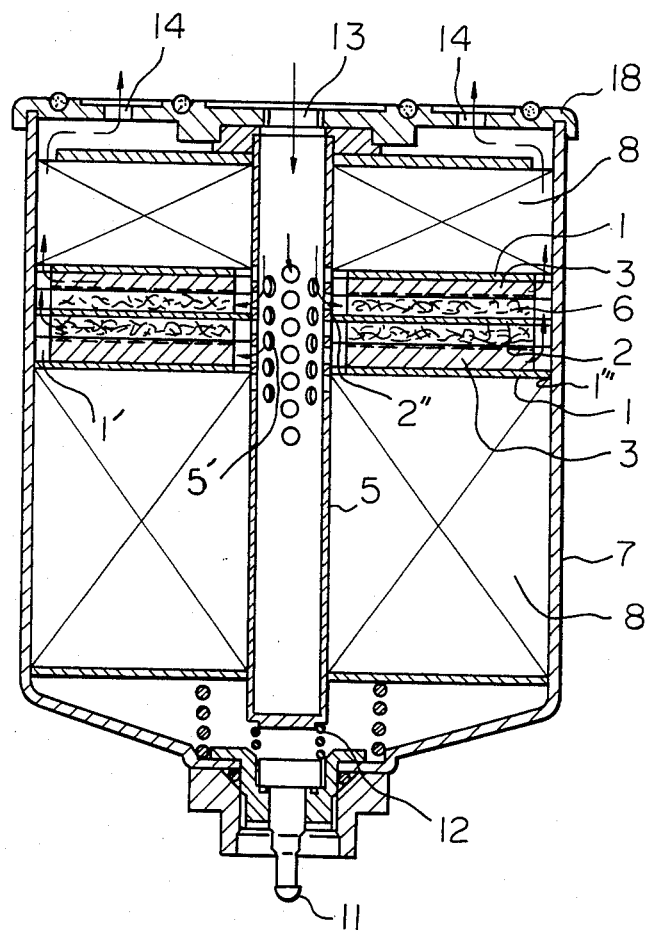
FIG. 9 is a vertical sectional view of the electrostatic filtering device of FIG. 8.

FIG. 9 shows an electrostatic filtering device having such a disklike filtering component assembly in a container 7. In FIG. 9, a part of the filtering component assembly, including the filtering components 1, 2, 3, and 6, is shown in an enlarged scale. Positive electrodes 1 are brought into contact with the inside of the container 7 at their peripheries 1''' for electrical connection thereto and are kept from contact with the metal bobbin 5. The negative electrode plates 2 are brought into contact with the metal bobbin 5 at the position 2" and are kept from contact with the metal container 7 due to the smaller outer diameter of the negative electrode 2 than the inner diameter of the container 7. The metal bobbin 5 is connected to a power supply (not shown) through a spring 12 and a terminal 11, enabling the supply of a negative voltage to the negative electrodes 2. Lubricating oil is introduced through a central opening 13 of an endcap 18 into the metal bobbin 5, flows out of the bobbin 5 through small holes 5' around the bobbine 5, enters the filtering component assembly 8, passes between the filtering components and the inside of the components until the outer peripheries thereof, then exits through the cutaway sections 1' and opening 14 of the endcap 18.

Figure 10:
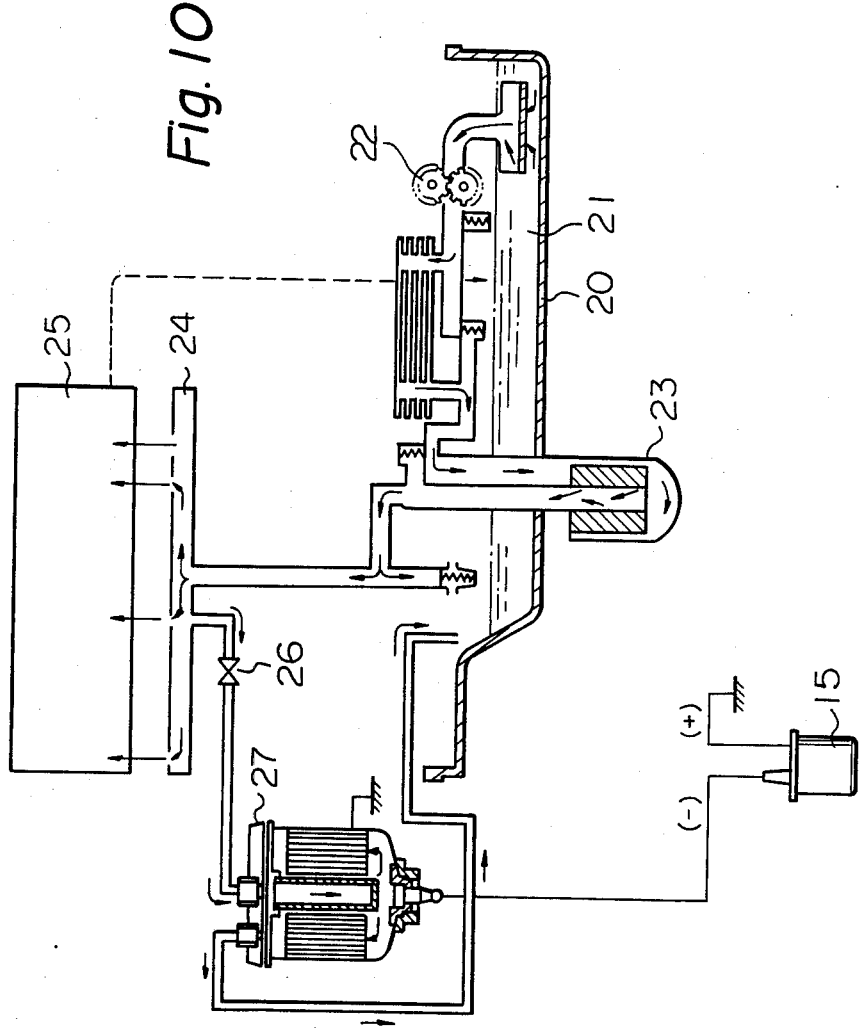
FIG. 10 shows a lubricating system including an electrostatic filtering device.

FIG. 10 shows a lubricating system for an actual internal combustion engine in which an electrostatic filtering device according to the present invention is assembled. Lubricating oil 21 is sucked up from an oil pan 20 by an oil pump 22 and is forced through a conventional filter 23, for removing relatively coarse contaminants, and through a main gallery 24 to the portions to be lubricated 25. Oil which has passed through the portions 25 is returned to the oil pan 20 by the action of gravity, etc. A part of the oil is fed from the main gallery 24 through a valve 26, for regulating the flow rate, to an electrostatic filtering device 27 according to the present invention. The cleaned oil is returned to the oil pan 20.

Figure 11:
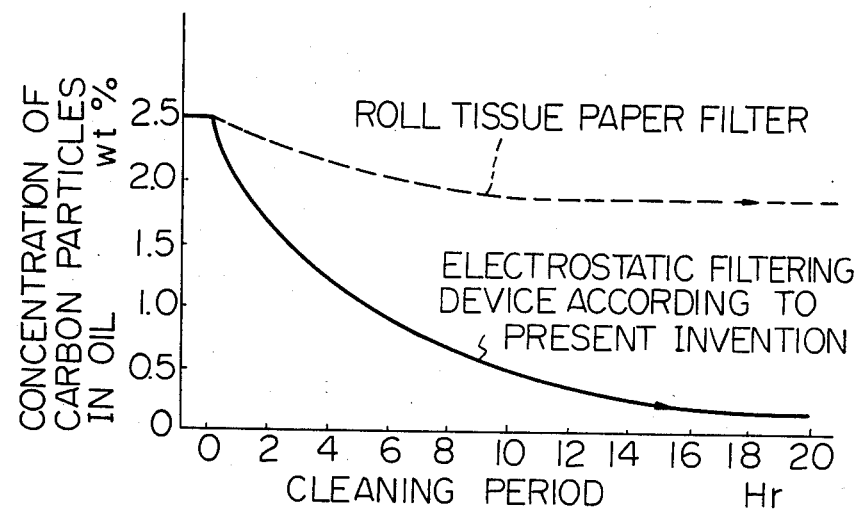
FIG. 11 is a graph of the results of an oil cleaning test.
Figure 12:
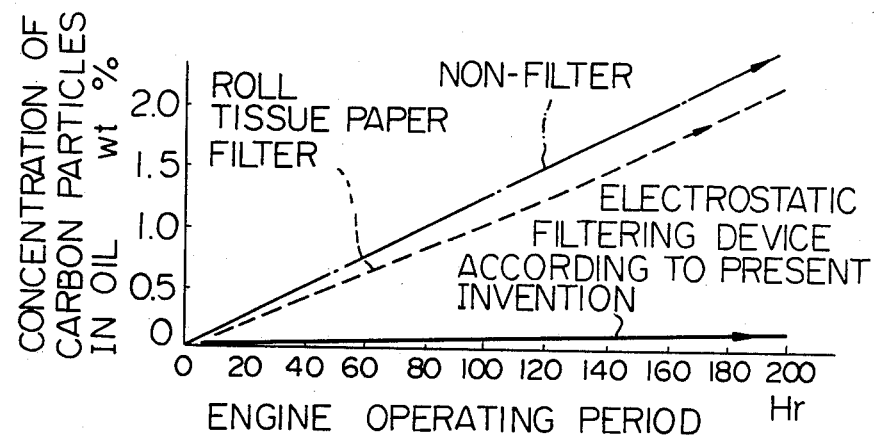
FIG. 12 is a graph of the results of the test of filtering devices by operating a diesel engine.

FIGS. 11 and 12 show the results of the tests on the oil-cleaning ability of filtering devices in the above-mentioned lubricating system. As a comparison with an electrostatic filtering device according to the present invention, a conventional filter which uses a roll tissue paper filter was also tested. The displacement of the diesel engine was 2200 cc, the speed 2000 rpm, and the output torque 6 kgw·m. The volume of the filtering component assembly was 600 cm$^3$ in both the electrostatic filtering device and the roll tissue paper filter, the volume of the lubricating oil 5000 cc, and the feed 30 cc per minute. A voltage of 2 kV was applied to the electrostatic filtering device, the amount of the current being 8 mA.

FIG. 11 shows a graph of the concentration of carbon particles in oil against the cleaning period, obtained by supplying contaminated lubricating oil containing a 2.5% by weight carbon particle concentration in oil to the lubricating system for cleaning. The conventional filter was only able to reduce the carbon particle concentration of in oil to about 1.9% by weight, even after 20 hours cleaning, thus had a carbon particle removal rate of about 24%. The electrostatic filtering device according to the present invention, on the other hand, reduced the carbon particle concentration in oil to about 0.25% by weight in 20 hours cleaning, thus had a cleaning, carbon particle removal rate of about 90%.

FIG. 12 shows a graph of the carbon particle concentration in oil against the engine operating period, obtained by operating a diesel engine using fresh uncontaminated oil. In a system without any filter or filtering device, the carbon particle concentration reached about 2.4% by weight after an operating period of 200 hours. A roll tissue paper filter was only able to keep this down to about 2.1% by weight, an undesirable amount. The electrostatic filtering device according to the present invention, however, was able to keep this down to about 0.15% by weight, an extremely low level of contamination.

While the present invention has been described with reference to preferred embodiments and examples, it is not restricted to those embodiments of examples. It will be understood by those skilled in the art that modifications may be made therein without departing from the spirit and scope of the invention.

What is claimed is:

1. An electric filtering device, especially for cleaning oil containing carbon particles, said device comprising:
   a container for receiving particle-containing liquid to be cleaned;
   a positive electrode placed in said container;
   a negative electrode arranged, in said container, physically substantially in parallel to said positive electrode;
   means for causing a flow of said liquid between and physically substantially in parallel to said positive and negative electrodes;
   means for electrically energizing said positive and negative electrodes to produce an electric field between said positive and negative electrodes;
   a porous dielectric film arranged between said positive and negative electrodes and having having pores ranging in width from 1 μm to 2 μm such that said particles to be collected cannot pass freely through the pore space of said porous dielectric film although the to-be-cleaned liquid itself can flow freely therethrough, whereby said particles are collected on the main surface of said porous dielectric film when an electric field is applied to said particle-containing liquid between said positive and negative electrodes; and
   porous spacers arranged between said porous dielectric film and each of said positive and negative electrodes, said porous spacers having pores larger than the pores of the dielectric film and a thickness such that said particle-containing liquid can flow freely through the pore space of said porous spacers and said particles collected on the main surface of said porous dielectric film can be stacked and held in the pore space of said porous spacers.

2. An electrostatic filtering device according to claim 1, wherein:
   said porous dielectric film has pores of a minimum size ranging from 1 μm to 2 μm.

3. An electrostatic filtering device according to claim 2, wherein:
   said minimum size of said pores of said dielectric film averages approximately 1.5 μm.

4. An electrostatic filtering device according to claim 3, further comprising:
   a supporter, to which said porous dielectric film is attached, for supporting said porous dielectric film.

5. An electrostatic filtering device according to claim 4, wherein:
   said supporter is made of cotton cloth.

6. An electrostatic filtering device according to claim 3, wherein:
   said spacer is a fibrous filter medium.

7. An electrostatic filtering device according to claim 6, wherein:
   said fibrous filter medium is made of synthetic fiber nonwoven cloth.

8. An electrostatic filtering device according to claim 6, wherein:
   said fibrous filter medium is cotton cloth.

9. An electrostatic filtering device according to claim 6, wherein:
   said fibrous filter medium is cellulose-based filter paper.

10. An electrostatic filtering device according to claim 1, wherein:
    said porous dielectric film is made of synthetic resin.

11. An electrostatic filtering device according to claim 10, wherein:
    said thickness of said porous spacers ranges from 0.5 mm to 0.6 mm.

12. An electrostatic filtering device according to claim 10, wherein:
    said synthetic resin is a fluorine-containing resin.

13. An electrostatic filtering device according to claim 12, wherein:
    said fluorine-containing resin is at least one of polytetrafluoroethylene and polychlorotrifluoroethylene.

14. An electrostatic filtering device according to claim 1, wherein:
    said porous dielectric film has a thickness ranging from 10 μm to 25 μm.

15. An electrostatic filtering device according to claim 1, wherein:
    said porous dielectric film is attached to one of said porous spacers whereby said one of said porous spacers has a role of supporter to said porous dielectric film.

16. An electrostatic filtering device according to claim 15, wherein:
said spacer is a fibrous filter medium.

17. An electrostatic filtering device according to claim 16, wherein:
said fibrous filter medium is made of synthetic fiber nonwoven cloth.

18. An electrostatic filtering device according to claim 16, wherein:
said fibrous filter medium is cotton cloth.

19. An electrostatic filtering device according to claim 16, wherein:
said fibrous filter medium is cellulose-based filter paper.

20. An electrostatic filtering device according to claim 1, wherein:
said porous spacers have a thickness of at least 0.3 mm.

21. An electrostatic filtering device according to claim 1, wherein:
said means for energizing is adapted to supply a voltage ranging from 2 kV to 3 kV to said positive and negative electrodes.

22. An electrostatic filtering device according to claim 1, wherein:
said electrodes, porous dielectric film, porous spacers and container respectively comprise strips of positive and negative electrodes, two porous dielectric films and four porous spacers, which are laminated in a sequence of (i) one of said positive and negative electrodes, (ii) first porous spacer, (iii) first porous dielectric film, (iv) second porous spacer, (v) the other one of said positive and negative electrodes, (vi) third spacer, (vii) second porous dielectric film and (viii) fourth spacer, wound around an electrically conductive cylindrical bobbin and contained in an electrically conductive cylindrical container, the inner end of said one of said positive and negative electrodes being in contact with said bobbin, the outer end of said other one of said positive and negative electrodes being in contact with said container.

* * * * *